Feb. 21, 1939.   M. DIAMOND   2,148,261
FRAME MOUNTING FOR MIRRORS, COVERS, ETC
Filed Jan. 27, 1938
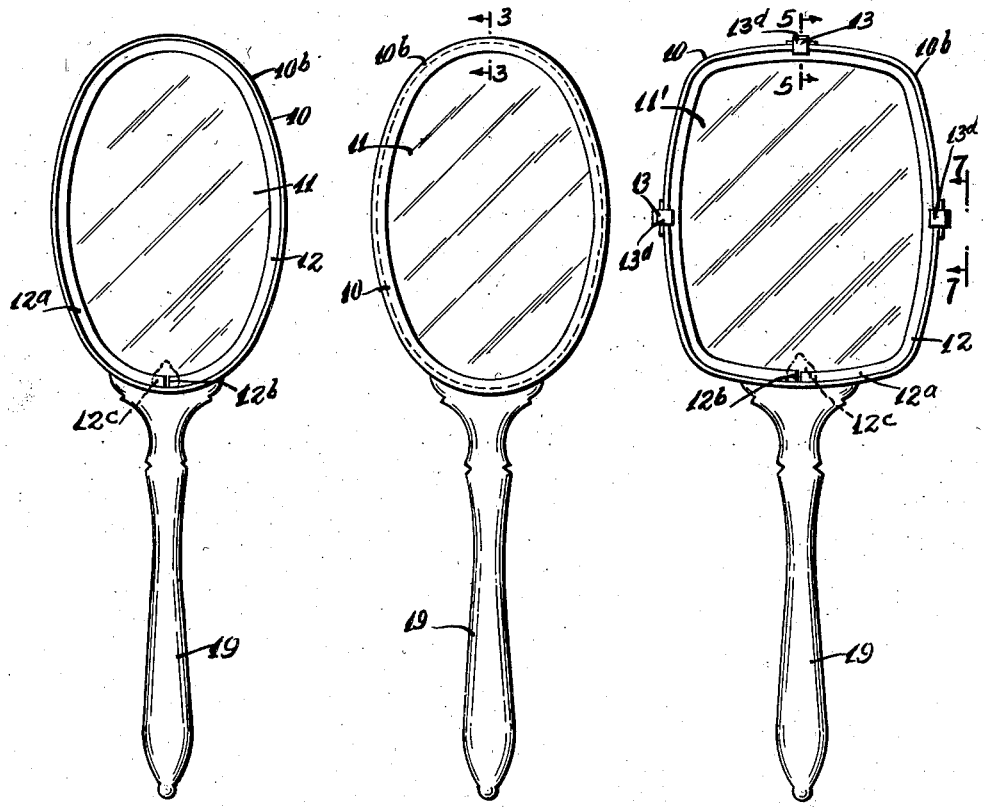
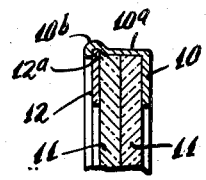
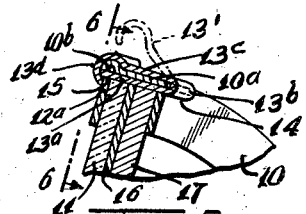
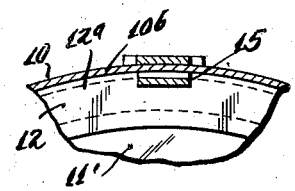
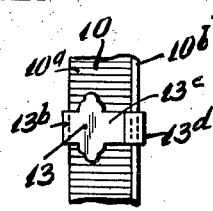
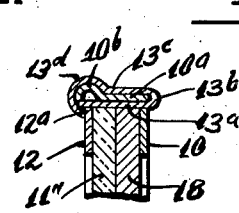
INVENTOR
Martin Diamond
BY
ATTORNEY Patented Feb. 21, 1939

2,148,261

UNITED STATES PATENT OFFICE 2,148,261

FRAME MOUNTING FOR MIRRORS, COVERS, ETC.

Martin Diamond, Brooklyn, N. Y.

Application January 27, 1938, Serial No. 187,179

3 Claims. (Cl. 88—102)

This invention relates to new and useful improvements in a frame mounting for mirrors, covers, etc.

More specifically, the invention proposes the construction of a frame mounting consisting of an outer rigid frame for mirrors, covers and the like having a perimeter wall with a free edge portion and a groove on the inner face thereof, and into which a mirror is adapted to be placed.

Still further it is proposed to provide an inner resilient frame for extending over the edge portion of the mirror and having an edge portion engaging in the groove for acting as an anchorage for the inner resilient frame to hold the mirror in position within the outer rigid frame.

Still further it is proposed to provide a plurality of clip members mounted on the outer frame and having a portion thereof extending over the inner frame for assisting in anchoring the resilient frame for properly positioning the mirror within the rigid frame.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a front elevational view of a frame mounting constructed according to this invention.

Fig. 2 is a rear elevational view of Fig. 1.

Fig. 3 is an enlarged sectional view taken on the line 3—3 of Fig. 2.

Fig. 4 is a view similar to Fig. 1 but illustrating a modification of the invention.

Fig. 5 is an enlarged perspective sectional view taken on the line 5—5 of Fig. 4.

Fig. 6 is an enlarged sectional view taken on the line 6—6 of Fig. 5.

Fig. 7 is a sectional view on the line 7—7 of Fig. 4.

Fig. 8 is a view similar to a portion of Fig. 5 but illustrating a further modification of the invention.

The frame mounting for mirror covers and the like, according to this invention, includes an outer rigid frame 10 for mirrors 11 having a perimeter wall 10ª with a free edge portion. A groove 10ᵇ is formed within the perimeter wall 10ª and longitudinally of the edge portion. An inner resilient frame 12 extends over the edge portion of the mirror 11 and has an edge portion 12ª engaging in the groove 10ᵇ to act as an anchor for the resilient frame 12 so as to hold the mirror 11 in proper position within the outer rigid frame 10.

The outer rigid frame is constructed of sheet metal of different shapes and designs and has its outer face ornamented and finished in gold, bronze, or any other suitable metallic or colored finishes. The groove 10ᵇ is formed by stamping a portion of the perimeter wall 10ª out of the plane of the remaining portion thereof so that the edge portions of the inner resilient frame may be engaged therein. The inner resilient frame is constructed from a strip of metal and has a split side portion 12ᵇ which permits this resilient frame to be engaged and disengaged with the groove 10ᵇ. The outer face of the resilient member is also ornamented to correspond with the outer face of the rigid frame 10.

A covering member 12ᶜ is provided over the split side portion 12ᵇ to ornament and conceal the latter.

According to the modification shown in Figs. 4–7, inclusive, a plurality of clip members are mounted on the outer frame 10 and have portions extending over the inner frame 11 for assisting in anchoring the inner frame in position in the rigid outer frame. Each of these clips 13 consists of an inner portion 13ª extending across the inner face of the perimeter wall 10ª of the outer rigid frame 10 and extends through an opening 14 formed in the rigid frame 10. The inner portion 13ª continues into an intermediate portion 13ᵇ which in turn continues into an outer portion 13ᶜ extending across the outer face of the perimeter wall 10ª of the rigid frame 10. The outer portion 13ᶜ further continues into a hook end portion 13ᵈ which extends around the groove bulge 10ᵇ and engages against the outer face of the resilient frame 12 for assisting the groove 10ᵇ in anchoring the resilient frame in position within the rigid frame 10. The end portion 13ᵈ may be disengaged from over the top of the groove bulge 10ᵇ as shown by the dot and dash lines 13' in Fig. 5 for permitting the inner portion 13ª to be disengaged from the space formed beneath the perimeter wall 10ª of the rigid frame 10.

The inner resilient frame 12 in the vicinity of the clip 13 is formed with a slot 15 extending inwards from the edge portion thereof and engaging around the inner portion 13ª of the clip 13. The mirror 11' rests against packing material 16 at its back side, and a backing member 17 is placed between the packing material 16 and the end wall of the rigid frame 10. In other respects this form of the invention is similar to the previous form and similar parts may be identified by corresponding reference numerals.

According to the modification shown in Fig. 8, the frame is constructed the same as the frame shown in Figs. 4–7, except that the mirror 11″ is provided only with a backing member 18 which is disposed between the back face of the mirror 11″ and the depending portion of the rigid frame 10.

The rigid frame 10 in all of the forms of the invention has at its bottom side, a handle 19 which facilitates the handling of the frame when the device is used as a mirror.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a frame mounting for mirrors, an outer rigid frame for mirrors having a perimeter wall with a free edge portion and a groove on the inner face of said wall longitudinally of said edge portion, and an inner resilient frame for extending over the edge portion of said mirror and having an edge portion engaging in said groove to act as an anchorage therefor, and a plurality of clip members on said outer frame and having portions extending over said inner frame to assist in the anchorage thereof, each comprising a strip of metal consisting of an inner portion extending across the inner face of said perimeter wall and extending through an opening formed in said outer rigid frame, an intermediate portion continuing from one end of said inner portion, an outer portion continuing from said intermediate portion and extending across the outer face of said perimeter wall, and an end portion continuing from said outer portion and extending around said groove and engaging against said inner resilient frame for assisting in anchoring an inner resilient frame within said outer rigid frame.

2. In a frame mounting for mirrors, an outer rigid frame for mirrors having a perimeter wall with a free edge portion and a groove on the inner face of said wall longitudinally of said edge portion, and an inner resilient frame for extending over the edge portion of said mirror and having an edge portion engaging in said groove to act as an anchorage therefor, and a plurality of clip members on said outer frame and having portions extending over said inner frame to assist in the anchorage thereof, each comprising a strip of metal consisting of an inner portion extending across the inner face of said perimeter wall and extending through an opening formed in said outer rigid frame, an intermediate portion continuing from one end of said inner portion, an outer portion continuing from said intermediate portion and extending across the outer face of said perimeter wall, and an end portion continuing from said outer portion and extending around said groove and engaging against said inner resilient frame for assisting in anchoring an inner resilient frame within said outer rigid frame, said inner resilient frame being formed with grooves extending around the inner portion of said clip.

3. In a frame, an outer rigid frame having a perimeter wall with a free edge portion and a groove on the inner face of said wall longitudinally of said edge portion, a mirror having a substantially flat face engageable into said frame with said groove exposed above the face thereof, and a substantially flat inner resilient frame for extending over the outer edge portion of said mirror, said resilient frame having its outer edge engaged into said groove so that said groove may hold said resilient frame in position within said rigid frame which in turn holds said mirror in position within the rigid frame, and a plurality of clip members on said rigid frame having portions thereof engaging the outer face of said resilient frame for assisting said groove in holding said resilient frame in position with said rigid frame, each of said clip members being constructed from a strip of metal consisting of an inner portion extending across the inner face of said perimeter wall and out through an opening formed in the back of said rigid frame, an outer portion continuing from said inner portion and extending across the outer face of said perimeter wall to said groove, and an end portion continuing from said outer portion and extending around said groove and the free edge portion of said perimeter wall and engaging against the outer face of said resilient frame.

MARTIN DIAMOND.